(12) United States Patent
Houseworth et al.

(10) Patent No.: US 10,867,356 B2
(45) Date of Patent: *Dec. 15, 2020

(54) SIMPLIFIED TAX INTERVIEW

(71) Applicant: HRB Innovations, Inc., Las Vegas, NV (US)

(72) Inventors: Jason Houseworth, Olathe, KS (US); Heather Watts, Kansas City, MO (US); Daniel D. Martin, Kansas City, MO (US)

(73) Assignee: HRB Innovations, Inc., Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/252,861

(22) Filed: Jan. 21, 2019

(65) Prior Publication Data

US 2019/0156431 A1 May 23, 2019

Related U.S. Application Data

(63) Continuation of application No. 14/630,012, filed on Feb. 24, 2015, now Pat. No. 10,186,000.

(51) Int. Cl.
*G06Q 40/00* (2012.01)

(52) U.S. Cl.
CPC ................. *G06Q 40/123* (2013.12)

(58) Field of Classification Search
CPC ................................................ G06Q 40/123
See application file for complete search history.

(56) References Cited

U.S. PATENT DOCUMENTS

| 8,635,127 | B1 | 1/2014 | Shaw |
| 2012/0027246 | A1 | 2/2012 | Tifford et al. |
| 2012/0109792 | A1* | 5/2012 | Eftekhari ............... G06F 21/31 705/31 |
| 2016/0180470 | A1 | 6/2016 | Mascaro et al. |
| 2016/0217533 | A1* | 7/2016 | Laaser ................ G06Q 40/123 |

FOREIGN PATENT DOCUMENTS

WO 2016/105584 A1 6/2016

OTHER PUBLICATIONS

Examination report No. 1 for standard patent application dated Feb. 22, 2017; Australian Patent Application No. 2016201095 Applicant: HRB Innovations, Inc.

(Continued)

*Primary Examiner* — Scott S Trotter
(74) *Attorney, Agent, or Firm* — Erise IP, P.A.

(57) ABSTRACT

A system, method and media for providing a simplified, personalized tax interview to a user preparing a tax return for a taxpayer by determining which portions of a full tax interview are relevant to the return being prepared and then presenting only those relevant portions to the user. To make this determination, one or more prototypes (each representing one or more underlying characteristics associated with the return that inform the relevant portions of the tax interview) are determined for the return based on information already known before the tax interview is presented and may be updated based on information entered during the tax interview.

17 Claims, 4 Drawing Sheets

(56) References Cited

OTHER PUBLICATIONS

Examination report No. 2 for standard patent application dated Jul. 3, 2017; Australian Patent Application No. 2016201095 Applicant: HRB Innovations, Inc.

Examination report No. 3 for standard patent application dated Dec. 6, 2017; Australian Patent Application No. 2016201095 Applicant: HRB Innovations, Inc.

Standard patent application has lapsed dated Mar. 7, 2018; Australian Patent Application No. 2016201095 Applicant: HRB Innovations, Inc.

Examination report No. 1 for standard patent application dated May 16, 2018; Australian Patent Application No. 2018200942 Applicant: HRB Innovations, Inc.

Refusal dated Oct. 11, 2018 dated May 16, 2018; Australian Patent Application No. 2018200942 Applicant: HRB Innovations, Inc.

Examination report No. 1 for standard patent application dated Oct. 16, 2018; Australian Patent Application No. 2018206822 Applicant: HRB Innovations, Inc.

Hearing Notice dated Oct. 30, 2018; Australian Patent Application No. 2018206822 Applicant: HRB Innovations, Inc.

Australian Examination Report for Australian Application No. 2019203821; dated Jul. 28, 2020.

* cited by examiner

SIMPLIFIED TAX INTERVIEW

RELATED APPLICATIONS

This non-provisional patent application is a continuation of and claims priority benefit, with regard to all common subject matter, to earlier-filed U.S. patent application Ser. No. 14/630,012, now patent Ser. No. 10/186,000, filed Feb. 24, 2015 and entitled "SIMPLIFIED TAX INTERVIEW." The identified earlier-filed patent applications are hereby incorporated by reference in their entirety into the present application.

This non-provisional patent application also shares certain subject matter with earlier-filed U.S. patent application Ser. No. 14/549,276, filed Nov. 20, 2014, now pending, and entitled "SIMPLIFIED SCREENING FOR PREDICTING ERRORS IN TAX RETURNS," and earlier-filed U.S. patent application Ser. No. 14/134,846, filed Dec. 19, 2013, now pending, and entitled "METHOD, SYSTEM, AND COMPUTER PROGRAM FOR PREDICTING TAX LIABILITIES AND BENEFITS." The identified earlier-filed patent applications are hereby incorporated by reference in their entirety into the present application as well.

BACKGROUND

1. Field

Embodiments of the invention generally relate to acquiring tax data for a taxpayer as part of the process of preparing and filing a tax return with a government tax authority and, more particularly, to using information gathered from prior tax returns, imported tax forms, and unstructured data associated with the user to determine portions of a tax interview relevant to the taxpayer's tax circumstances and present only those relevant portions of the tax interview to the user without presenting the full tax interview.

2. Related Art

Traditionally, preparing a tax return by or on behalf of a taxpayer has been a laborious task. Because the same basic return (with minor variations) serves for all taxpayers, it must necessarily be comprehensive to address the various sources of income, deductions, and credits that any taxpayer might claim. To reduce the complexity and burden of preparing an individual tax return, tax-preparation services such as H&R Block® provide a tax interview at the beginning of the process of preparing the return so that categories of questions and entries that are not relevant to the individual taxpayer can be omitted. However, even with such a tax interview, the process of preparing a return remains burdensome, and abbreviating a tax interview too far runs the risk that one or more relevant categories of questions will be skipped, either due to the taxpayer misunderstanding the interview question, or forgetting one or more items of tax data that could make it relevant to them. Such an omission could lead to an overpayment of taxes, or an underpayment (resulting in back taxes and penalties when the error is discovered). Accordingly, there is a need for a simplified tax interview process that determines which questions are relevant to a particular return and presents only those questions to the preparer without presenting the full tax interview.

SUMMARY

Embodiments of the invention address the above problem by applying an analysis of a large volume of completed tax returns to data from the taxpayer's past returns and imported tax form data to accurately determine which prototypes (each of which represents one or more underlying characteristics associated with the return that inform the relevant portions of the tax interview) apply to a return to predict which categories of questions are relevant to the preparation of a particular return. In a first embodiment, the invention includes a system for presenting a simplified tax interview to a taxpayer, comprising a data store storing a plurality of tax returns, a typecasting engine comprising a classifier operable to determine a prototype for a tax return being classified based on values of a plurality of indicator variables associated with prescreen data for the tax return being classified, a data import engine, operable to import tax data for the taxpayer for a prior tax return, download one or more tax forms corresponding to the taxpayer, and based at least on the tax data and the tax forms, determine one or more values for the indicator variables for the tax return being classified, and a user interface engine operable to present a portion of a full tax interview to the taxpayer without presenting the full tax interview, wherein the portion is selected based on the prototype determined by the classifier and is personalized to the taxpayer's tax data.

In a second embodiment, the invention includes a method of presenting a simplified tax interview to a taxpayer, comprising the steps of importing prescreen data associated with a tax return for the taxpayer, comparing said prescreen data to a plurality of indicator variables, identifying at least one prototype based on said comparing, identifying a first portion of a full tax interview based on the at least prototype, and without presenting a full tax interview, presenting the identified first portion of the full tax interview to the taxpayer.

In a third embodiment, the invention includes one or more computer-readable media storing computer-executable instructions which, when executed by computer perform a method of determining a simplified tax interview for a taxpayer, the method comprising the steps of importing tax data relating to a plurality of previously prepared tax returns from a data store storing said tax data, applying cluster analysis to said tax data to generate a plurality of clusters, each of said clusters including a plurality of previously prepared tax returns, based on said clusters, determining a plurality of prototypes, for each prototype, determining one or more indicator variables corresponding to said prototype, and storing said prototypes and said indicator variables in a prototype data store.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the current invention will be apparent from the following detailed description of the embodiments and the accompanying drawing figures.

BRIEF DESCRIPTION OF THE DRAWING FIGURES

Embodiments of the invention are described in detail below with reference to the attached drawing figures, wherein.

Figure 1:
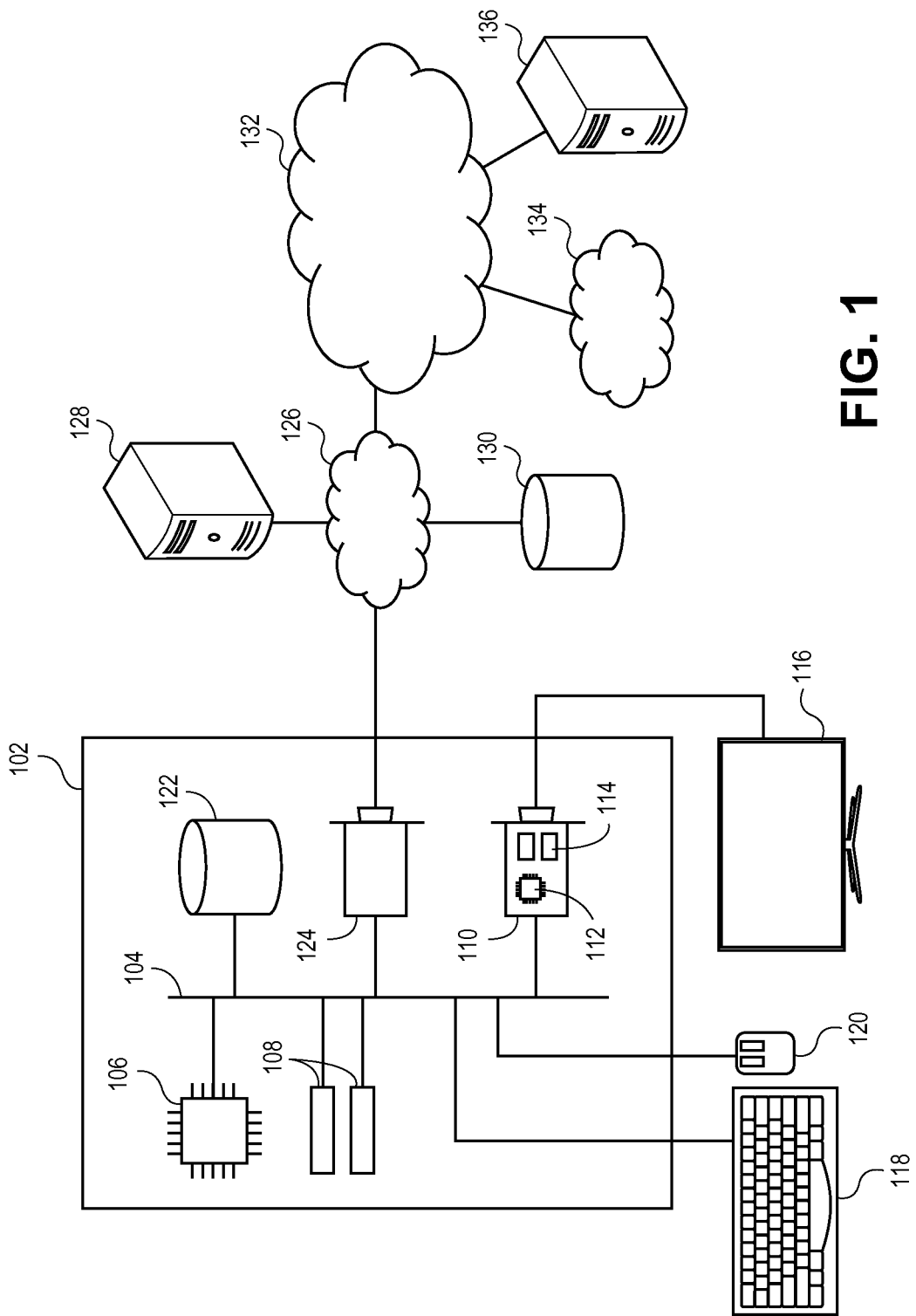
FIG. 1 depicts an exemplary hardware platform that can form one element of certain embodiments of the invention.

The drawing figures do not limit the invention to the specific embodiments disclosed and described herein. The drawings are not necessarily to scale, emphasis instead being placed upon clearly illustrating the principles of the invention.

DETAILED DESCRIPTION

The subject matter of embodiments of the invention is described in detail below to meet statutory requirements; however, the description itself is not intended to limit the scope of claims. Rather, the claimed subject matter might be embodied in other ways to include different steps or combinations of steps similar to the ones described in this document, in conjunction with other present or future technologies. Minor variations from the description below will be obvious to one skilled in the art, and are intended to be captured within the scope of the claimed invention. Terms should not be interpreted as implying any particular ordering of various steps described unless the order of individual steps is explicitly described.

The following detailed description of embodiments of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the invention. The following detailed description is, therefore, not to be taken in a limiting sense. The scope of embodiments of the invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate reference to "one embodiment" "an embodiment", or "embodiments" in this description do not necessarily refer to the same embodiment and are also not mutually exclusive unless so stated and/or except as will be readily apparent to those skilled in the art from the description. For example, a feature, structure, or act described in one embodiment may also be included in other embodiments, but is not necessarily included. Thus, the technology can include a variety of combinations and/or integrations of the embodiments described herein.

Operational Environment for Embodiments of the Invention

Turning first to FIG. 1, an exemplary hardware platform that can form one element of certain embodiments of the invention is depicted. Computer 102 can be a desktop computer, a laptop computer, a server computer, a mobile device such as a smartphone or tablet, or any other form factor of general- or special-purpose computing device. Depicted with computer 102 are several components, for illustrative purposes. In some embodiments, certain components may be arranged differently or absent. Additional components may also be present. Included in computer 102 is system bus 104, whereby other components of computer 102 can communicate with each other. In certain embodiments, there may be multiple busses or components may communicate with each other directly. Connected to system bus 104 is central processing unit (CPU) 106. Also attached to system bus 104 are one or more random-access memory (RAM) modules. Also attached to system bus 104 is graphics card 110. In some embodiments, graphics card 104 may not be a physically separate card, but rather may be integrated into the motherboard or the CPU 106. In some embodiments, graphics card 110 has a separate graphics-processing unit (GPU) 112, which can be used for graphics processing or for general purpose computing (GPGPU). Also on graphics card 110 is GPU memory 114. Connected (directly or indirectly) to graphics card 110 is display 116 for user interaction. In some embodiments no display is present, while in others it is integrated into computer 102. Similarly, peripherals such as keyboard 118 and mouse 120 are connected to system bus 104. Like display 116, these peripherals may be integrated into computer 102 or absent. Also connected to system bus 104 is local storage 122, which may be any form of computer-readable media, and may be internally installed in computer 102 or externally and removeably attached.

Computer-readable media include both volatile and nonvolatile media, removable and nonremovable media, and contemplate media readable by a database. For example, computer-readable media include (but are not limited to) RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data temporarily or permanently. However, unless explicitly specified otherwise, the term "computer-readable media" should not be construed to include physical, but transitory, forms of signal transmission such as radio broadcasts, electrical signals through a wire, or light pulses through a fiber-optic cable. Examples of stored information include computer-useable instructions, data structures, program modules, and other data representations.

Finally, network interface card (NIC) 124 is also attached to system bus 104 and allows computer 102 to communicate over a network such as network 126. NIC 124 can be any form of network interface known in the art, such as Ethernet, ATM, fiber, Bluetooth, or Wi-Fi (i.e., the IEEE 802.11 family of standards). NIC 124 connects computer 102 to local network 126, which may also include one or more other computers, such as computer 128, and network storage, such as data store 130. Generally, a data store such as data store 130 may be any repository from which information can be stored and retrieved as needed. Examples of data stores include relational or object oriented databases, spreadsheets, file systems, flat files, directory services such as LDAP and Active Directory, or email storage systems. A data store may be accessible via a complex API (such as, for example, Structured Query Language), a simple API providing only read, write and seek operations, or any level of complexity in between. Some data stores may additionally provide management functions for data sets stored therein such as backup or versioning. Data stores can be local to a single computer such as computer 128, accessible on a local network such as local network 126, or remotely accessible over Internet 132. Local network 126 is in turn connected to Internet 132, which connects many networks such as local network 126, remote network 134 or directly attached computers such as computer 136. In some embodiments, computer 102 can itself be directly connected to Internet 132.

Operation of Embodiments of the Invention

At a high level, embodiments of the invention provide a system, method and media for providing a simplified, personalized tax interview to a user preparing a tax return for a taxpayer by determining which portions of a full tax interview are relevant to the tax return being prepared and then presenting only those relevant portions to the user without presenting the full tax interview. To make this determination, one or more prototypes are determined for the taxpayer's tax return based on information either already known before the tax interview is presented or gathered during presentation of the tax interview. As discussed in detail below, a prototype is one or more underlying characteristics associated with a tax return that informs the relevant portions of the personalized tax interview. These prototypes can be automatically generated by data mining prior tax returns or manually added based on tax professional subject-matter expertise, as also discussed further below.

In general, a full tax interview is the complete set of questions (and corresponding responses by the user), which would be needed to complete a tax return for a returning user. Of course, the invention is not limited to use by returning users; new users may provide the basic demographic and profile information when using the system for the first time. For an individual taxpayer, many questions of a full tax interview are irrelevant to the taxpayer's tax situation. As an example, if the taxpayer has no dependents, then it is irrelevant to ask the taxpayer if there are childcare expenses for the Child and Dependent Care Credit offered by the IRS. In this case, the full tax interview is shortened because the taxpayer is not asked about childcare expenses. However, in other embodiments of the invention, the personalized tax interview may be specific to received tax data items. For example, and as discussed in detail below, if the taxpayer has unemployment income, this information may be used to trigger asking the taxpayer about any job-hunting expenses. Therefore, embodiments of the invention advantageously personalize the full tax interview presented to the client based on the prototypes relevant to the taxpayer's tax situation.

It should be appreciated that the tax situation and tax data items discussed herein relate to a particular taxpayer, although a user of the invention may be the taxpayer or a third party operating on behalf of the taxpayer, such as a professional tax preparer ("tax professional") or an authorized agent of the taxpayer. Therefore, use of the term "taxpayer" herein is intended to encompass either or both of the taxpayer and any third party operating on behalf of the taxpayer. Additionally, a taxpayer may comprise an individual filing singly, a couple filing jointly, a business, or a self-employed filer. Furthermore, the term "full tax interview," as used herein, is the complete set of questions (and corresponding responses by the user), which would be needed to complete a tax return for a returning user. Thus demographic or other profile (such as the taxpayer's address) would not be a part of the full tax interview, but questions related to that information (such as "Has your address changed in the past year?") might be.

Identification of Prototypes and Classification of Returns By Typecasting Engine To present a personalized tax interview to the taxpayer that is specific to the taxpayer's tax situation but that also insures no required questions or information is omitted from the tax interview, embodiments of the invention include a typecasting engine that statistically analyzes a large volume of previously filed tax returns from a plurality of disparate taxpayers. The typecasting engine broadly comprises a statistical analyzer 204, a prototype data store 208, and a classifier 210. The goal of the typecasting engine is to identify prototypes that, when relevant to an individual taxpayer or tax return, would inform or otherwise change the presented tax interview so as to personalize the interview. The typecasting engine then stores the identified prototypes in the prototype data store for retrieval during generation and presentation of a particular personalized tax interview to a taxpayer, as discussed below.

As briefly noted above, a prototype is one or more underlying characteristics of a tax return that informs, influences, or otherwise causes a change to the presented tax interview relative to a full tax interview. Thus, each prototype may reflect a rule indicating when certain portions of the full tax interview should or should not be presented to the user. Each prototype has an associated set of indicator variables (corresponding to items of tax data) that determine which returns fall into that prototype. As a high-level example, one prototype might be "Roth-ineligible" (i.e., a tax return for a taxpayer whose income is such that no contributions to a Roth IRA are available). The corresponding indicator variables would then include the taxpayer's filing status (e.g., married filing jointly, single, head of household, etc.) and modified adjusted gross income (AGI). Thus, the indicator variables are specific types of items of tax data (e.g., filing status or AGI); the item of tax data itself is the quantitative value associated with the indicator variable for a particular tax return (e.g., married filing jointly or an AGI of $150,000); and the prototype is the underlying characteristic associated with the tax return that would inform whether certain tax interview questions or requests for information are or are not presented (e.g., whether or not the taxpayer is "Roth-ineligible"). It should further be appreciated that items of tax data are not limited to information entered on a tax form; rather, they include any information used in the course of preparing the return, and can be derived from other items of tax data.

Embodiments of the invention then use the values of these indicator variables for a given tax return to determine whether the prototype applies to that return. In the above example, classifier would determine that the Roth-ineligible prototype applies to the return being classified if the filing status is single and the modified AGI is greater than $129,000. If the system knows that this prototype applies to the return being prepared, then it can personalize the tax interview by forgoing asking the taxpayer about Roth IRA contributions.

As the previous example illustrates, some prototypes (and the associated indicator variables and portions of the tax interview) may result directly from the tax code. In other cases, the prototypes, indicator variables, and interview portions may be semantically linked without being imposed by the tax code. For example, an indicator variable of a rural zip code may be associated with a "farmer" prototype that means questions about farm income should be included in the interview. Still other prototypes may not have such a direct, semantic connection between the indicator variable and the relevant portions of the interview. For example, a particular income level in combination with a particular number of dependents may indicate that questions about self-employment should be considered in the interview. These examples are purely illustrative and are not intended to be limiting. A person of skill in the art will appreciate that a single indicator variable may be associated with multiple prototypes and vice versa.

Figure 2:
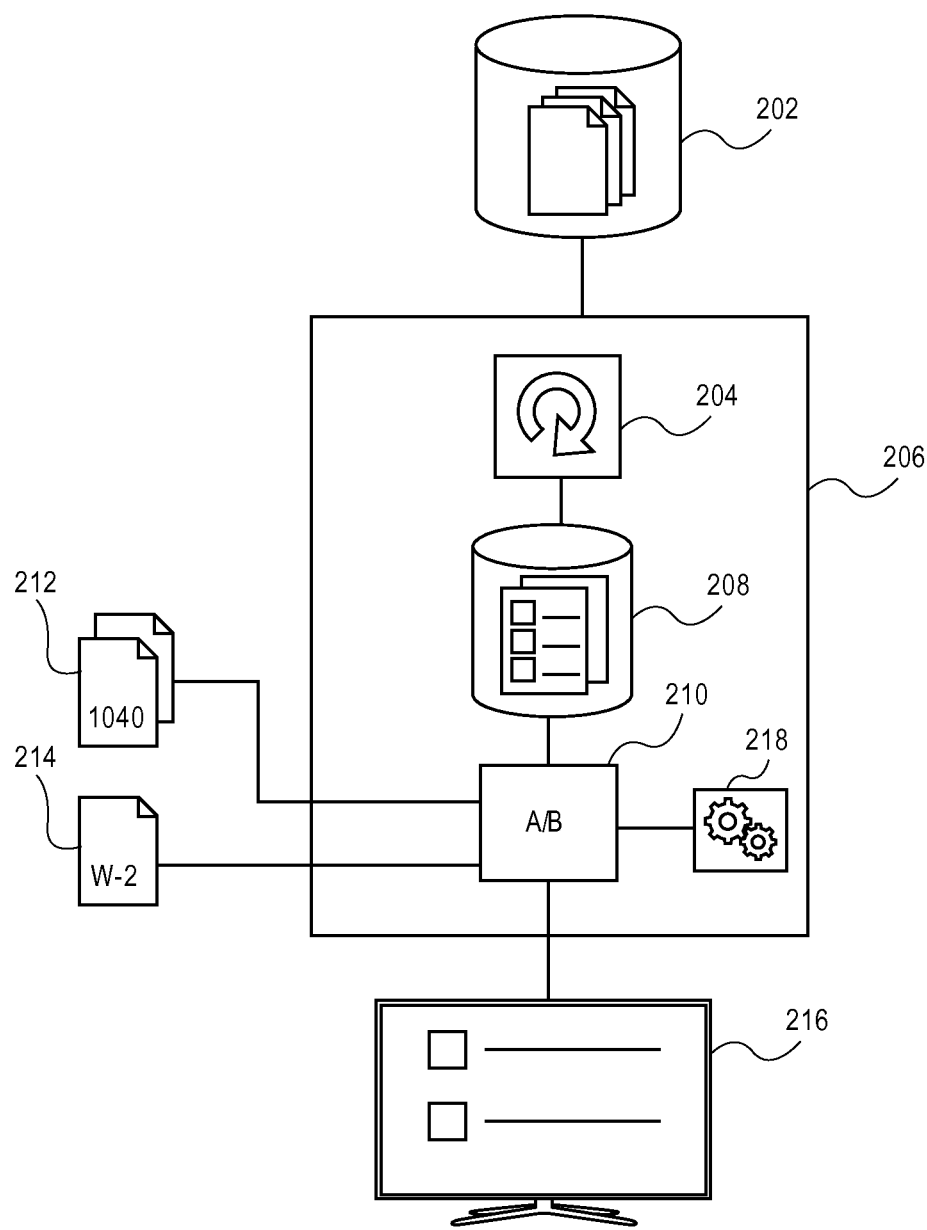
FIG. 2 depicts a system in accordance with one embodiment of the invention.

When embodied as a system, the invention includes components for storing and analyzing a large volume of previously filed tax returns to generate a number of prototypes and determine indicator variables corresponding to each prototype. Such embodiments of the invention further include components for importing tax data associated with the taxpayer from prior returns or from downloaded tax forms, and for analyzing the tax data to determine which prototype or prototypes satisfy the return being prepared. Such embodiments of the invention also include user interface components for presenting only the appropriate portions of the tax interview to the user once the appropriate prototype or prototypes have been identified. Turning now to FIG. 2, a system in accordance with one embodiment of the invention is depicted. A data store 202 stores a number of previously prepared tax returns. In embodiments of the invention, the stored previously prepared tax returns are for a plurality of different taxpayers. These returns may be for prior tax years or for the current year. More recent returns may be preferentially used to provide more accurate classifications in light of changing tax law. In some embodiments, responses to tax interviews may be stored in association with the previously prepared tax returns. In some embodiments, the previously prepared tax returns may be anonymized to protect taxpayer privacy. These returns serve as input to statistical analyzer 204 of typecasting engine 206. As noted above, typecasting engine 206 broadly comprises statistical analyzer 204, prototype data store 208, and classifier 210. A person of skill in the art will appreciate that many different arrangements and distributions of these components is possible within the scope of the invention.

Typecasting engine 206 generally performs two functions: a first function is to populate the prototype data store 208 with prototypes identified by statistical analyzer 204; and a second function is to personalize a tax interview for an individual taxpayer by classifying using classifier 210 the taxpayer's tax return according to prototypes associated with the tax return. Discussing now the first general function of the typecasting engine 206, the purpose of statistical analyzer 204 is to determine prototypes for returns and indicator variables associated with those prototypes. A person of skill in the art will appreciate that such a calculation, particularly on a large data set, is only possible with the aid of computer-assisted statistical techniques such as multivariate analysis and/or cluster analysis. As described above, each prototype can be thought of as a rule for determining when a portion of the tax interview should or should not be presented, and the indicator variables can be thought of as the factors on which the rule is based. Statistical analyzer 204 automatically infers these rules and factors based on historical return data and other sources.

In particular and in one embodiment, a cluster analysis technique such as density-based clustering can be employed. In general, cluster analysis is the study of how to group a set of objects in such a way that similar objects are placed in the same group. These categories need not be known a priori, or even have any semantic meaning associated with them. Here, the objects are the completed tax returns stored in data store 202, and the resulting clusters become the prototypes. Density-based clustering defines clusters to be areas of higher density in a higher-dimension space representing the various features of the objects. Thus, clusters in this application will contain tax returns that share many similar features. As such, the portions of the tax interview that are relevant will be common among the returns in a cluster.

In another embodiment, a different technique performed by statistical analyzer 204 for identifying prototypes is biclustering. Biclustering allows the simultaneous clustering of the dependent and independent variables of a data set. In this way, a set of dependent variables (here, tax-data items) that exhibit similar behavior across a set of independent variables (here, for example, stored responses to interview questions) can be identified, and vice versa. These biclusters can then be used to predict the interview questions that will be relevant for a given set of prescreen data.

Other techniques can also be used by statistical analyzer 204 to predict the interview questions that are relevant for a given indicator variable or combination of variables. For example, the presence of a given tax form may be determined to reliably correlate to the filing of a particular schedule that requires asking some interview question(s). Additionally, it will be appreciated that, as additional tax returns are added to data store 202, the set of prototypes and indicator variables can be refined by re-analyzing the larger data set to improve accuracy. Accordingly, statistical processor 204 may regularly re-calculate the prototypes and indicator variables based on the most current data.

Based on the output of statistical analyzer 204, data store 208 is populated with a set of prototypes and indicator variables. Table 1 below is a non-inclusive list of examples of the indicator variables for a selection of prototypes and the corresponding portions of the tax interview associated with those prototypes.

TABLE 1

| Values for Indicator Variables | Corresponding Interview Portion |
| --- | --- |
| Rural zip code with deductible expenses but no farm income | Prompt for farm income |
| Homeowner claiming mortgage interest deduction | Prompt for cash charitable deductions |
| Filing a regular 1040 (non-EZ, non-A) | Prompt for cash item expense deductions |
| Household income above a threshold | Prompt for charitable deductions |
| Paid locality tax and live in a different state | Prompt for vacation days |
| Taxpayer or spouse is over age 65 | Prompt for social security income. |
| Taxpayer is head of household and doesn't have any earned income | Prompt for alimony income |
| Returning taxpayer has a new address vs. prior year | Prompt for moving expenses and/or noncash donations |
| Taxpayer is a noncustodial parent | Prompt for alimony payments. |
| Taxpayer lives in a non-tax state | Prompt for sales tax deduction |
| Taxpayer lives in a location impacted by a major natural tragedy (storm, tornado, hurricane) | Prompt for casualty loss |
| Taxpayer has unemployment income | Prompt for job-hunting expenses |

TABLE 1-continued

| Values for Indicator Variables | Corresponding Interview Portion |
|---|---|
| Taxpayer had a W-2 withholding for a different state | Prompt for a credit for taxes paid to another state |
| Taxpayer has a dependent that is over age 19 | Prompt for tuition and fees and/or education credit |

The combined set of prototypes and indicator variables is stored in data store 208 for subsequent use by classifier 210. In some embodiments, the portions of the tax interview relevant to the prototypes are also stored in data store 208. In other embodiments, they are stored separately and can be determined based on the prototype or prototypes determined by classifier 210.

In some embodiments, data store 208 may be further augmented by empirically determined prototypes and indicator variables. For example, if statistical analyzer 204 did not generate the "farmer" prototype described above (perhaps due to a small number of previous returns that matched the prototype), it could be manually added to the database after statistical analyzer 204 has analyzed the returns in data store 202 but before classifier 210 determines prototypes based on prescreen data.

Discussing now the second general function of the typecasting engine 206, classifier 210 broadly determines which prototypes apply to a particular taxpayer's tax return. Regardless of the statistical analysis technique used by statistical analyzer 204, classifier 210 can assign each return to soft clusters, representing a likelihood that the return belongs to a given cluster. If the likelihood that a return falls into a particular cluster is above a given threshold, then the corresponding prototype can be assigned to that return. In some embodiments, this implies that at most one prototype can be assigned to a given return. In other embodiments, the threshold is such that a plurality of clusters have likelihoods that fall above the threshold for the return, and as such, a plurality of prototypes are assigned to the return and a plurality of portions of the interview are presented to the user. As such, the threshold for assigning a prototype to a return becomes a parameter that can be used to adjust the trade-off between presenting the user with too many questions in the tax interview and potentially omitting a relevant question.

Classifier 210 begins by ingesting the prescreen data for the return being classified using a data import engine component. It is the function of data import engine to interface with the wide variety of systems from which it can be retrieved. For example, the data import engine may interface with the storage for user profiles, various tax form providers including financial institutions, financial service providers, etc. and/or a historical tax return data store. The data import engine communicates with these internal and external components to retrieve the raw prescreen data and convert it into a standard form useable by classifier 210. In some embodiments, this conversion takes the form of determining the values associated with various indicator variables. Prescreen data can be derived from the user's profile, which contains basic demographic information about the user that is less likely to change from year to year. Examples of information that may be contained in the user's profile include the user's name, taxpayer identification number, date of birth, marital status, dependent information, and so forth. In some embodiments, a user is prompted for updates to the profile information they have previously entered during the prescreen process. In some such embodiments, a user may specify that certain profile items will not change and should not be prompted for updates in the future. For example, once a user reaches a certain age, they may decide that their dependent information will never again change. Additionally, some profile items such as date of birth and taxpayer identification number may always be unchanging and never require updates. Profile items may also be imported from prior year tax returns 212, as may be the case if the user has not previously created a profile. Changes in profile data items may be relevant in themselves. For example, a change in address as compared to the prior tax reporting period may indicate that the return satisfies a "recently moved" prototype so that the interview should include questions relating to moving expenses. In some embodiments, data import engine can obtain prescreen data from financial institution systems and financial services providers by providing a login screen for the taxpayer's account, and then automatically importing account information if the login is successful.

Prescreen information may also come from tax forms 214 for the current tax reporting period that have been imported from one or more tax form providers. In some embodiments, classifier 210 includes a dedicated submodule for importing tax forms from a variety of tax form providers, including payroll processors, banks, investment companies, government tax authorities, and other sources. Such imported forms include prescreen information both in the form of the actual tax data as well as additional demographic information about the taxpayer. For example, a wage statement (such as a W-2 in the United States) may include information including the taxpayer's full name and address in addition to the income information. Prescreen information may also be inferred based on other prescreen information alone or in combination with external data sources. For example, to determine the "farmer" prototype describe above, the taxpayer's zip code (as entered by the user or imported from a tax form such as a W-2) must be combined with a list of zip codes that have been determined to be rural. Similarly, to determine whether the "natural disaster" prototype is applicable, the zip code must be combined with a list of zip codes in which natural disasters have occurred in the prior tax reporting period.

In addition, the immediate source for tax data items may itself be another source of prescreen data. For example, a wage statement (such as a W-2 statement in the United States) that can be automatically imported or downloaded from a payroll processor may cause the return to satisfy different prototypes from the same wage statement manually entered by the user, and a hand-written wage statement may cause the return to satisfy a third set of prototypes, even if all three wage statements contain the same wage data.

In some embodiments, additional prescreen data can be imported from other sources. Classifier 210 may interface with one or more ways of tracking tax data throughout the year in order to import additional tax and prescreen data. As a first example, financial management software may track charitable donations or business expenses. As another example, a tax preparation service may provide a smartphone application for tracking tax-relevant receipts and/or cash payments as they arise over the course of tax year. This data may be gathered in structured or unstructured form. The former case requires more effort by the taxpayer as it is entered, but less effort during the tax preparation process.

Once all the prescreen data has been entered, imported, and/or inferred, classifier 210 determines which, if any, prototypes apply to the current return. The precise operation of classifier 210 will depend on the type of analysis techniques used by statistical analyzer 204. In general, each type of analysis technique will have a corresponding classifier to determine to which, if any, clusters the current return belongs. As described above, the classifier may use either hard clustering or soft clustering. For further discussion, the reader is referred to a text covering cluster analysis and classification such as *Cluster Analysis, Fifth Edition* by Everitt, et al., which is hereby incorporated by reference.

Once classifier 210 has determined the set of prototypes that apply to the current return, the corresponding portions of the tax interview can be presented to the user via user interface engine 216 without presenting the full tax interview. In some embodiments, user interface engine 216 presents a standard minimum set of interview questions in addition to the questions corresponding to the prototypes identified for the return being classified. In other embodiments, the minimal questions are included in the set of questions associated with each prototype. In still other embodiments, prototypes remove questions from a standard set of questions. Once the user uses user interface engine 216 to provide responses to the set of questions provided in the interview, a tax preparation engine 218, as is known in the art, can use the responses in combination with the collected prescreen data to complete the tax return. However, where a conventional tax return preparation engine would require the user's responses to the full tax interview, the tax preparation engine 218 used by embodiments of the invention can prepare an accurate return without presenting the full tax interview to the user, based on the output of classifier 210.

When embodied as a method, embodiments of the invention include methods for generating prototypes based on prior tax returns and classifying a return being prepared based on those prototypes in order to present only the relevant portions of a tax interview. In the former case, the method can includes steps of importing a plurality of previously prepared returns, importing tax interview responses corresponding to those returns, analyzing the imported returns and responses for similarities, generating prototypes based on the statistical analysis and augmenting the generated prototypes with additional, known prototypes. In the latter case, the method can include steps of ingesting prescreen data, determining the applicable prototypes, presenting only the relevant portions of the tax interview to the user, and preparing the tax return based on the prescreen data and the user's responses.

Generation of the Prototype Data Store

Figure 3:
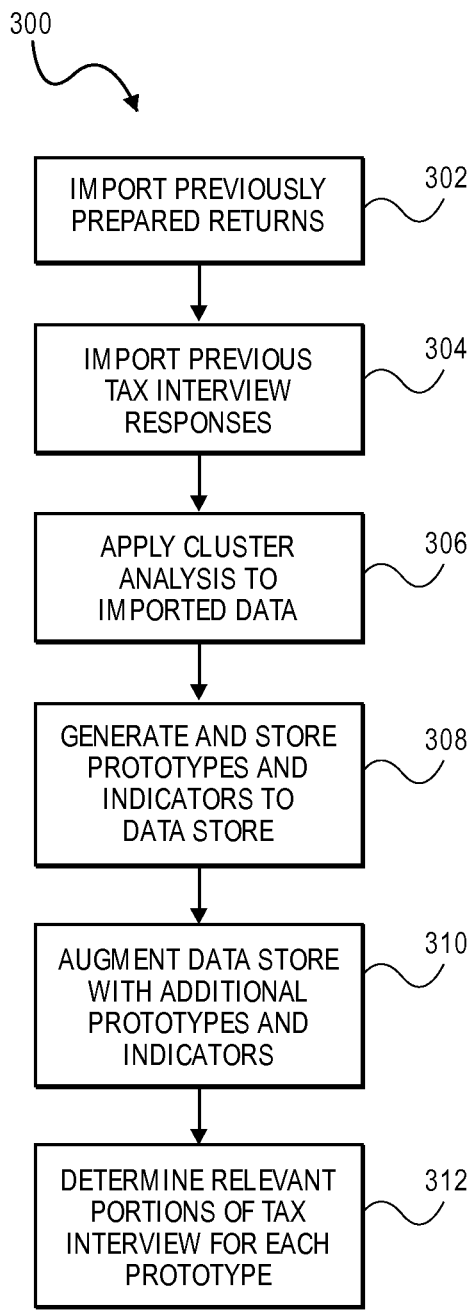
FIG. 3 depicts a flowchart illustrating the operation of one embodiment of the invention.

Turning now to FIG. 3, a flowchart illustrating the operation of one embodiment of the invention is depicted, and referred to generally by reference numeral 300. Initially, at step 302, a plurality of previously prepared tax returns 202 is imported by statistical analyzer 204. In some embodiments, tax returns 202 are actual tax returns that have been previously prepared prior to filing. In other embodiments, returns 202 are specially prepared training data representing typical taxpayer profiles. In still other embodiments, tax returns 202 represent a mix of actual and synthetic returns. In some such embodiments, synthetic returns are weighted more heavily by statistical analyzer 204 than actual returns. In other embodiments, they are weighted less heavily or equally.

Processing then proceeds to step 304 where the responses to the tax interview that correspond to each of returns 202 are imported by statistical analyzer 304. For those embodiments where part or all of tax returns 202 are synthetic, the tax interview responses may also be synthetic. For those embodiments where tax returns 202 are actual returns, the corresponding tax interview questions may be the actual responses for those tax returns, they may be automatically generated based on the corresponding returns, or they may be manually entered based on the corresponding returns. In other embodiments, no tax interview questions are imported at this step; rather, interview questions are identified with particular entries or sets of entries in tax returns 202. In such embodiments, once the returns are clustered based on the various entries they contain, returns being prepared are classified into the appropriate clusters and then the questions appropriate to the common values in those clusters are presented.

Next, at step 306, statistical analyzer 204 analyzes the imported data. In some embodiments, statistical analyzer 204 uses some form of cluster analysis. One of skill in the art will appreciate that many different clustering algorithms are possible and may be employed in various embodiments of the invention. For example, density-based clustering techniques such as DBSCAN and OPTICS may be appropriate where tax interview response data is not available, while biclustering techniques such as SAMBA and FABIA may be appropriate where response data is available as well. Other cluster analysis and non-cluster analysis techniques, now known or later discovered, may also be used to generate the prototypes and indicator variables, and are considered to be within the scope of the invention.

At step 308, based on the analysis performed at step 306, statistical analyzer 204 generates and stores prototypes and the corresponding indicators in prototype data store 208. The representation of the information stored will, of course, depend on the precise statistical analysis technique used. In some embodiments, the prototypes will be information useable to determine a set of interview questions to present to the user. In other embodiments, the prototypes will be the interview questions themselves. In still other embodiments, the prototypes will contain information identifying a cluster or clusters of returns, which can be used to determine the relevant interview questions to present to the user as described above. The indicator variables are broadly one or more pieces of prescreen data common to the returns falling into the cluster corresponding to the associated prototype. In some embodiments, these indicator variables are binary variables; in other embodiments, they are continuous variables. This data store can subsequently be used by classifier 210 to determine the appropriate prototype or prototypes for the return being prepared, as described below.

Processing then proceeds to step 310, where prototype data store 208 is, in some embodiments, augmented with additional prototypes and indicator variables. In some embodiments, these additional prototypes are added where the prior returns falling into the prototype are too varied to automatically generate a robust set of indicator variables. In other embodiments, the additional prototypes may be sufficiently rare that the set of prior returns 202 does not include enough returns to accurately categorize them. In still other embodiments, the additional prototypes may be considered sufficiently important that it is considered worthwhile to specially create a set of indicator variables for them. In yet other embodiments, all known prototypes are used to augment data store 208, regardless of whether a similar prototype has been generated by statistical analyzer 204, so as to offer the most complete set of interview questions for each return.

Finally, at step 312, one or more portions of the tax interview are determined that are relevant to each of the prototypes. For those embodiments where tax interview responses are imported for each of prior returns 202, this may be a separate commonality analysis for the sets of responses in the cluster corresponding to the prototype. If biclustering is used to analyze the prior return data, the relevant questions may be automatically generated as a part of that analysis. In some embodiments, the relevant portions of the tax interview are instead determined during the process of preparing a return, as discussed below.

Classification of Tax Returns

Figure 4:
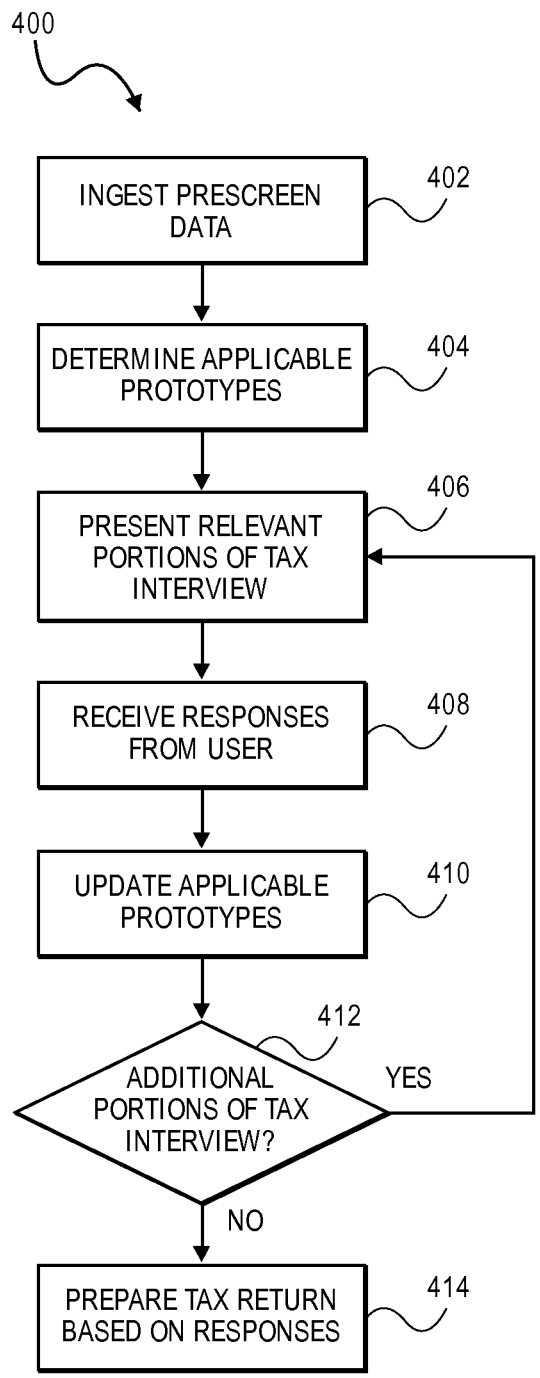
FIG. 4 depicts a flowchart illustrating the operation of another embodiment of the present invention.

Turning now to FIG. 4, a flowchart illustrating the operation of another embodiment of the present invention is depicted, and referred to generally by reference numeral 400. By contrast to method 300, which describes the population of prototype data store 208, method 400 broadly describes the use of prototype data store 208 to determine and present the appropriate set of interview questions to a user. In some embodiments, method 300 is performed in conjunction with method 400; for example, method 300 may be performed immediately before method 400 every time method 300 is performed. In other embodiments, method 300 is performed periodically (such as daily, weekly, or monthly) to update prototype data store 208, and each of the executions of method 400 uses the most recently updated version of prototype data store 208. In still other embodiments, data store 208 is updated annually based on the returns filed for the previous tax period.

Method 400 begins at step 402, where prescreen data for the tax return being prepared is ingested. As described above, prescreen data for a given return can take a variety of forms, including information extracted from imported tax forms, stored demographic data from prior year tax returns 212, information imported from an associated user account, information recorded by the user over the course of the tax year, and so forth. In some embodiments, prescreen data may be presented to the user for confirmation; for example, the address may be extracted from the return for the previous tax reporting period, and presented to the user for updating if necessary. In some cases, the user may also provide context for the prescreen data; for example, if the user made use of a smartphone application to capture images of tax-relevant receipts over the course of the tax reporting period, these images may be ingested together with the other prescreen data, and presented to the user to categorize as, for example, a business expense or charitable contribution.

Processing then continues at step 404, where classifier 210 determines the applicable prototypes for the return. Broadly speaking, where prototypes are rules for determining when a portion of the full tax interview should or should not be presented, the classifier 210 applies each of these rules to the tax return being prepared to generate the simplified, personalized tax interview. The details of how the classification is performed may vary depending on the algorithms used by statistical analyzer 204. For example, if statistical analyzer 204 uses a density-based clustering algorithm, the return being classified may be given a score for each cluster based on its proximity to the centroid or border of that cluster. Then, any prototypes associated with cluster scores above (or below) a particular threshold are determined to be relevant to the return being prepared. In those embodiments where only a single prototype is associated with each return, the prototype associated with the nearest cluster (i.e. the one with the highest or lowest score) to the return being classified is determined to the applicable prototype for that return. Alternatively, boundaries (either overlapping or mutually exclusive) can be determined for each cluster and the return can be associated with each cluster whose boundaries contain it. In some embodiments, a return being classified may not satisfy the criteria for belonging to any clusters. In such cases, no prototypes or a default prototype may be associated with the return. Once the prototypes associated with the return have been determined, processing proceeds to step 406.

At step 406, the relevant portions of the tax interview are determined and presented to the user by user interface engine 216. Broadly, each portion of the tax interview includes one or more questions designed to elicit information from the user to complete the tax return being prepared. It is an object of embodiments of the invention to present the user with a minimal set of questions while still eliciting all information needed to correctly prepare the return, without presenting a full tax interview. In some embodiments, one or more portions of the tax interview are identified with each cluster with which a return can be associated; those portions identified with the clusters associated with the return being prepared are presented to the user. In other embodiments, each cluster has a relevancy score for each portion of the tax interview; the respective relevancy scores for each cluster associated with the return being prepared are summed and any portions of the tax interview where the total score exceeds a predetermined threshold are presented to the user by user interface engine 216.

As part of this process, at step 408, the user provides responses via user interface engine 216 to each question presented in the tax interview. In some embodiments, user interface engine 216 may also present default answers to each question in the interview portion based on the prescreen data and prior returns 202 which can be affirmed or corrected by the user. In some embodiments, the user may select an option to receive additional help regarding the question being presented by user interface engine 216. Any method of presenting questions and receiving responses may be utilized by user interface engine 216 to carry out steps 406 and 408.

As the user enters additional tax data items at step 408, classifier 210 may update the set of applicable prototypes at step 410 and determine that the return being prepared satisfies additional prototypes, or that previously identified prototypes are no longer satisfied. As discussed above, the applicable set of prototypes depends of the values included in prescreen data for the relevant indicator variables. Values entered by the user in response to interview questions can provide additional values for indicator variables which could alter the applicability of certain prototypes. Furthermore, the user may correct certain imported prescreen values during the interview process, and this may implicate additional prototypes not previously identified as applicable, or cause prototypes previously identified as applicable to be no longer considered applicable. When this occurs, the tax interview being presented to the user may change, and additional portions of the full tax interview may be presented to the user. Alternatively, portions of the tax interview previously identified to be presented to the user may be removed from consideration and no longer presented. For example, if the return being prepared was previously identified as satisfying the "Roth-ineligible" prototype described above based on a previously stored filing status of "single" and a modified AGI determined based on imported tax forms, questions regarding Roth contributions would be removed from the presented tax interview. However, if the user indicates that the current filing status should instead be "married filing jointly" during the tax interview, this may cause re-classification of the return such that the questions regarding Roth contributions are now presented. If tax data items are entered by the user cause the return to satisfy a prototype that it did not previously satisfy, the presented portions of the interview may similarly change.

Next, at decision 412, it is determined whether any relevant portions of the full tax interview remain to be presented to the user based on the updated set of applicable prototypes. In some embodiments, step 410 updating applicable prototypes is carried out after each portion of the tax interview is presented to the user so as to present the most accurate personalized tax interview to the user, and accordingly decision 412 will be made for each portion of the tax interview presented. In other embodiments, step 410 and decision 412 are only reached after all previously determined portions of the tax interview have been presented to the user to determine of more portions need to be presented. If more portions of the tax interview remain to be presented to the user, processing returns to step 406; otherwise, processing continues at step 414.

Finally, at step 414, the tax return preparation engine competes the return based on the prescreen data, including the collected prescreen data, and the user's responses to the tax interview, as discussed above. In some embodiments, tax preparation engine 218 can also check the completed return for consistency against the completed returns corresponding to the determined prototypes, and any inconsistencies flagged for the user's review. For example, if the taxpayer's return is determined to match the "farmer" prototype described above, and if the prior returns used to generate that prototype all reported estimated tax payments while the return being prepared does not indicate that estimated tax payments were made, this inconsistency may be reported to the user for potential correction. In some embodiments, once the return has been prepared, it is added to prior returns 202 for use in future iterations of method 300. Once the return has been prepared, it can be presented to the user for review and filing.

Many different arrangements of the various components depicted, as well as components not shown, are possible without departing from the scope of the claims below. Embodiments of the invention have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims. Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. A system for presenting a simplified tax interview to a taxpayer, comprising:
a data store storing a plurality of tax returns;
a typecasting engine comprising:
a classifier operable to determine a prototype for a tax return being classified based on values of a plurality of indicator variables associated with prescreen data for the tax return being classified,
said prototype corresponding to an underlying characteristic of the tax return that influences the tax interview;
a data import engine, operable to:
import tax data for the taxpayer for a prior tax return;
download one or more tax forms corresponding to the taxpayer;
based at least on the tax data and the tax forms, determine one or more values for the indicator variables for the tax return being classified; and
a user interface engine operable to present a portion of a full tax interview to the taxpayer without presenting the full tax interview, wherein the portion is selected based on the prototype determined by the classifier and is personalized to the taxpayer's tax data, wherein the classifier identifies the prototype by way of cluster analysis of prior tax returns.

2. The system of claim 1, wherein the typecasting engine further comprises a statistical analyzer operable to analyze the plurality of tax returns and identify the plurality of indicator variables and corresponding prototypes.

3. The system of claim 1, wherein the plurality of indicator variables and corresponding prototypes are determined by a subject-matter expert.

4. The system of claim 1, wherein the prescreen data is derived form a prior-year tax return for the taxpayer.

5. The system of claim 1, wherein the prescreen data is captured using a smartphone application.

6. The system of claim 1, further comprising:
a tax return preparation engine;
wherein the user interface engine is further operable to receive responses from the taxpayer to the presented portion of the full tax interview; and
wherein the tax return preparation engine is operable to prepare the tax return based on the imported tax data, tax forms, and received responses.

7. The system of claim 6, wherein the tax return preparation engine is further operable to submit the prepared tax return to a governmental taxation authority.

8. The system of claim 1, wherein the user interface engine presents a plurality of portions of the full tax interview to the taxpayer without presenting the full tax interview, and wherein the plurality of portions arc is selected based on a plurality of prototypes determined by the classifier.

9. A method of presenting a simplified tax interview to a taxpayer, comprising the steps of:
importing prescreen data associated with a tax return for the taxpayer;
comparing said prescreen data to a plurality of indicator variables;
identifying at least one prototype based on said comparing, wherein the identified prototype is selected from a set of prototypes automatically generated by data mining prior tax returns:
applying cluster analysis to the prior tax returns;
said at least one prototype corresponding to an underlying characteristic of the tax return that influences the tax interview;
identifying a first portion of a full tax interview based on the at least prototype; and without presenting a full tax interview, presenting the identified first portion of the full tax interview to the taxpayer.

10. The method of claim 9, wherein the step of identifying at least one prototype comprises identifying a plurality of prototypes, and wherein the step of identifying a first portion of a full tax interview based on the at least prototype comprises identifying a plurality of portions of the full tax interview based on the plurality of prototypes.

11. The method of claim 9, wherein the prescreen data is derived form a prior-year tax return for the taxpayer.

12. The method of claim 9, further comprising the steps of:

receiving responses to the presented portion of the full tax interview;

based on the received responses and the prescreen data, preparing the tax return for the taxpayer; and submitting the prepared tax return to a governmental taxation authority.

13. The method of claim 9, wherein the prescreen data is captured using a smartphone application.

14. One or more computer-readable media storing computer-executable instructions which, when executed by computer perform a method of determining a simplified tax interview for a taxpayer, the method comprising the steps of:

importing tax data relating to a plurality of previously prepared tax returns from a data store storing said tax data;

data mining said tax data to determine a plurality of prototypes by applying cluster analysis to the previously prepared tax returns;

each of said plurality of prototypes corresponding to an underlying characteristic of a tax return that influences a tax interview for preparing the tax return;

for each prototype, determining one or more indicator variables corresponding to said prototype; and storing said prototypes and said indicator variables in a prototype data store.

15. The media of claim 14, wherein the step of data mining comprises applying biclustering to the tax data.

16. The media of claim 14, wherein the step of data mining comprises applying density-based clustering to the tax data.

17. The media of claim 14, wherein the method further comprises the steps of:

determining, based on prescreen data for a tax return being prepared, one or more prototypes of the plurality of prototypes corresponding to the tax return being prepared;

modifying a tax interview for the tax return being prepared based on the plurality of prototypes.

* * * * *